Dec. 1, 1925.

F. A. NIEBERDING

VALVE

Filed Sept. 24, 1923

1,563,916

Inventor
Frank A. Nieberding
By Hull, Brock & West
Attys.

Patented Dec. 1, 1925.

1,563,916

UNITED STATES PATENT OFFICE.

FRANK A. NIEBERDING, OF CLEVELAND, OHIO.

VALVE.

Application filed September 24, 1923. Serial No. 664,439.

*To all whom it may concern:*

Be it known that I, FRANK A. NIEBERDING, a citizen of the United States, residing at Cleveland, in the county of Cuyahoga and State of Ohio, have invented a certain new and useful Improvement in Valves, of which the following is a full, clear, and exact description, reference being had to the accompanying drawings.

This invention relates to improvements in valves, and more particularly as they have to do with that class of valves used in connection with gas stoves and ranges.

The objects of the invention are to provide what is known as a needle valve wherein the so-called "needle point" controls the flow of gas immediately at the gas emitting orifice so that the quantity of gas issuing from said orifice may be very accurately governed but the velocity thereof unretarded throughout the entire range of adjustment, the flow thus being prevented from becoming sluggish and the combustion poor as the fire is turned down, a fault common in that class of valves known as gas cocks; to utilize a lever in place of the usual hand wheel for adjusting the needle valve whereby the same may be opened and closed quickly and conveniently and its condition ascertained at any time by observing the position of the lever; to provide a valve of the aforesaid class that is reliable, durable and practically immune from disorder, the latter resulting largely from the absence of the usual packing gland or packing material about the valve operating stem or spindle, my improved valve incorporating a ground joint in lieu thereof; to provide a valve of the aforesaid class that is compact and so designed that when it is applied to a gas supply pipe or manifold it will not unduly protrude but will appear neat and will be protected against objects striking or catching upon it, and reduce the possibility of its being thus accidentally turned on; and to provide a valve construction that is simple, that is convenient and comparatively inexpensive of manufacture, and wherein the parts are readily accessible.

Figure 1:
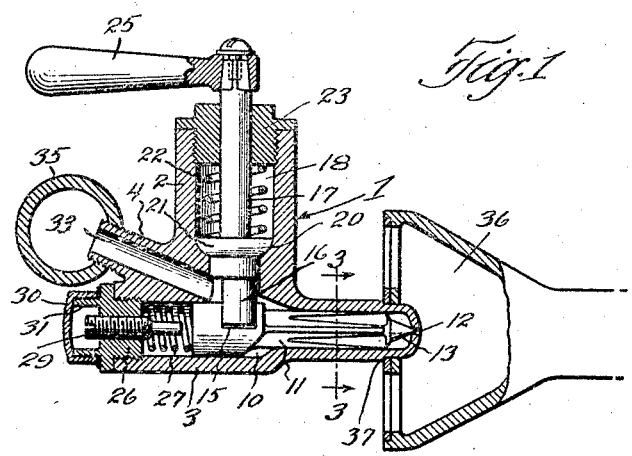
Figure 2:
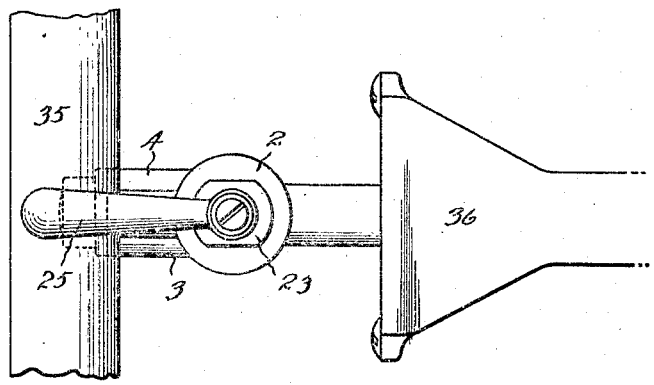
Figure 3:

The foregoing objects, with others hereinafter appearing, are attained in the embodiment of the invention illustrated in the accompanying drawing wherein Fig. 1 is a sectional side elevation of the valve associated with a manifold and the mixer of a gas burner; Fig. 2 is a plan view of what is shown in Fig. 1; Fig. 3 is a section on the line 3—3 of Fig. 1; and Fig. 4 is a diagram showing how the valve casing is designed to facilitate its attachment to a supply pipe or manifold.

The valve casing which is designated 1 has a vertical branch 2, a horizontal branch 3, and a diagonal branch 4 which is disposed between the rear side of the branch 2 and the upper rear end portion of the branch 3, the branch 4 terminating at its outer end in a threaded portion 5. A bore 10 extends through the horizontal branch 3 of the casing and is divided about midway of its length into sections of different diameters. A valve body 11 is guided within said bore and its rear end is substantially cylindrical and has a sliding fit within the larger section of the bore, while its forward end is shown as flattened on four sides and guided by the portions between its flattened sides within the smaller section of the bore. The forward end of the bore is closed except for a comparatively small gas emitting aperture 12 into which projects a so-called needle point 13 that is formed at the forward end of the valve body. Disposed within a transverse groove 15 that is formed in the upper side of the enlarged inner end of the valve body is an eccentric pin 16 which extends from the lower end of a valve operating spindle 17 that occupies a chamber 18 in the vertical branch 2 of the casing. The lower end of the chamber 18 is formed with a converging wall providing a seat 20 which is engaged by a rounded enlargement 21 of the valve operating spindle, the enlargement and seat providing a joint that is gas tight when the enlargement is forced against the seat by a spring 22 that is compressed between the enlargement and a screw plug 23 that is threaded into the upper end of the branch 2. A lever 25 is fastened to the upper end of the spindle 17 where it protrudes beyond the plug 23.

A screw plug 26 closes the outer end of the bore 10 and a spring 27 is compressed between the inner end of the plug and the opposed end of the valve body 11. The inclusion of the spring 27 is preferable, if not necessary, inasmuch as it serves to advance the valve body toward closing position and insures the valve being held tightly closed even though wear should occur between the eccentric pin 16 and the front wall of the groove 15. The tension of the spring 27 must, of course, be inferior to the friction of the parts which opposes the spring's tendency to close the valve. The parts are so designed that substantially a quarter turn of the spindle 17 will move the valve body from closed to full-open position, and the valve body is adapted to be stopped in open position by the inner end of an adjusting screw 29 that is threaded through the plug 26. To prevent the screw 29 from being tampered with it may be protected by a cap 30 that is screwed onto a hollow boss or extension 31 of the plug 26. A port 33 leads through the branch 4 of the casing to the forward end of the bore 10.

Figure 4:
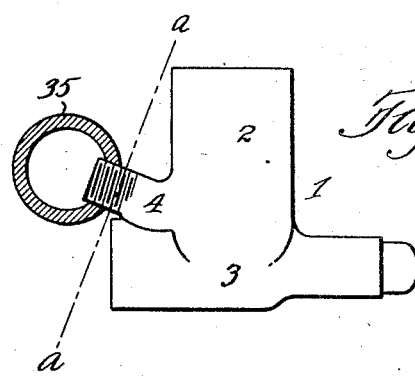

It will be seen by reference to the diagram of Fig. 4 that the threaded portion 5 of the branch 4 is beyond a line a—a that is perpendicular to the axis of the branch 4 and escapes the ends of the branches 2 and 3 of the casing. This enables the portion 5 to be screwed into a tapped hole in the manifold 35, when the plugs 23 and 26 are removed from the casing, by turning the casing with respect to the manifold.

The forward end of the branch 3 is reduced in diameter for insertion through a hole in the mixer 36.

Having thus described my invention, what I claim is:—

1. In a valve, a casing having a bore that is reduced at one end to provide a fluid emitting orifice and enlarged at the other to form a guideway, the casing being also provided with an ingress port and with an opening both of which communicate with said bore, a valve body that is provided with a part having a sliding fit in the bore, the body being enlarged at one end to effect a similar fit in the guideway and reduced at the other end for cooperation with the orifice, means closing the end of the bore opposite the orifice, a spring interposed between said means and the valve body, and a valve operating member extending through the aforesaid opening and having operative connection with the valve body.

2. In a valve, a casing having a bore that is reduced at one end to provide a fluid emitting orifice, the casing also being provided with an ingress port and with an opening, both of which communicate with said bore, a valve body reciprocable within the bore and having a part cooperating with the orifice, an adjustable stop situated at the end of the bore opposite the orifice for limiting the movement of said valve body in a direction away from the orifice, a valve operating member extending through the aforesaid opening and having operative connection with the valve body, and a cap enclosing and protecting the adjustable stop.

3. In a valve, a casing having a bore that is reduced at one end to provide a fluid emitting orifice, the casing also being provided with an ingress port and with an opening, both of which communicate with said bore, a valve body reciprocable within the bore and having a needle point cooperating with the orifice, means closing the end of the bore opposite the orifice, a stop adjustably carried by said means for limiting the movement of said valve body in a direction away from the orifice, a valve operating member extending through the aforesaid opening and having operative connection with the valve body, and a cap applied to the aforesaid means for protecting the adjustable stop.

4. In a valve, a casing having a bore that is reduced at one end to provide a fluid emitting orifice, the casing also being provided with an ingress port and with an opening, both of which communicate with said bore, a valve body reciprocable within the bore and having a part cooperating with the orifice, an adjustable stop situated at the end of the bore opposite the orifice for limiting the movement of said valve body in a direction away from the orifice, a valve operating member extending through the aforesaid opening and having operative connection with the valve body, and means for protecting the adjustable stop.

5. In a valve, a casing comprising a main branch and a lateral branch extending at right angles from an intermediate part of the main branch and a diagonal branch between the outer ends of the main and lateral branches, said branches enclosing respectively a bore that is reduced at its inner end to provide a fluid emitting orifice, a chamber that is contracted adjacent its inner end to provide a seat and extends therebeyond into the aforesaid bore, and a fluid ingress port which opens into the bore, a valve body reciprocable within the bore and having at its inner end a part for cooperation with the aforesaid orifice and having also opposed abutments that are spaced apart longitudinally of the body, a valve operating spindle extending through the chamber and having at its inner end an eccentric pin disposed between the abutments of the valve body, said spindle having also an enlargement engaging the aforesaid seat, the enlargement and seat being designed to provide a ground joint, a member closing the outer end of the chamber and within which the corresponding end of the spindle is guided, a spring compressed between said closure and the enlargement of the spindle and tending to urge the spindle in a direction to force its enlargement against the seat, and means closing the outer end of the bore.

6. In a valve, a casing comprising a main branch and a lateral branch extending at right angles from an intermediate part of the main branch and a diagonal branch which is substantially perpendicular to a line touching the outer ends of the main and lateral branches, the diagonal branch having a portion extending beyond said line that is designed for connection with a supply conduit, valve mechanism contained within one of the right angle branches, and operating means therefor that is housed within the other right angle branch.

In testimony whereof, I hereunto affix my signature.

FRANK A. NIEBERDING.